United States Patent [19]

Malkin et al.

[11] Patent Number: 6,061,650
[45] Date of Patent: *May 9, 2000

[54] METHOD AND APPARATUS FOR TRANSPARENTLY PROVIDING MOBILE NETWORK FUNCTIONALITY

[75] Inventors: Gary Malkin, Lowell; Nancy Kossack, Wayland, both of Mass.; Paul Raison, Londonderry, N.H.; Thuan Tran, Watertown; Ellis L. Wong, Melrose, both of Mass.

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/714,407

[22] Filed: Sep. 10, 1996

[51] Int. Cl.⁷ .............................. C06F 13/14; H04L 9/00; H04L 12/22
[52] U.S. Cl. .......................... 704/228; 713/201; 370/401
[58] Field of Search .................................. 364/284.4, 284; 370/401, 351, 389; 395/200.58, 200.3, 200.57, 200.33, 200.59; 709/229, 228, 227; 713/200, 201, 202

[56] References Cited

U.S. PATENT DOCUMENTS

| | | | |
|---|---|---|---|
| 5,530,703 | 6/1996 | Liu et al. | 370/85.13 |
| 5,563,937 | 10/1996 | Bruno et al. | 379/201 |
| 5,586,260 | 12/1996 | Hu | 395/200.2 |
| 5,598,536 | 1/1997 | Slaughter, III et al. | 709/228 |
| 5,649,099 | 7/1997 | Theimer et al. | 709/229 |
| 5,742,598 | 4/1998 | Dunn et al. | 370/393 |
| 5,745,884 | 4/1998 | Carnegie et al. | 705/34 |

OTHER PUBLICATIONS

Fox et al., "Security on the Move: Indirect Authentication Using Kerberos", International Conference On Mobile Computing and Networking, Nov. 11–12, 1996. pp. 155–164.

Thanh et al. "Making Mobility Transparent to the Applications", Vehicular Technology Conference, 1996 IEEE 46th, pp.1825–1829 vol. 3.

*Primary Examiner*—Dung C. Dinh
*Attorney, Agent, or Firm*—Blakely Sokoloff Taylor & Zafman LLP

[57] ABSTRACT

A method and apparatus for transparently providing a remote node with mobile network functionality. One embodiment of the present invention includes a remote node contacting a service provider to establish a remote connection with a home network. In response, the service provider generated an authentication request, on behalf of the remote node to obtain access to the home network. The service provider then sends the authentication request to an authentication server residing at the home network. The service provider then establishes, on behalf of the remote node, a remote connection between the remote node and the home network to enable packets to be transferred between the remote node and the home network.

26 Claims, 4 Drawing Sheets

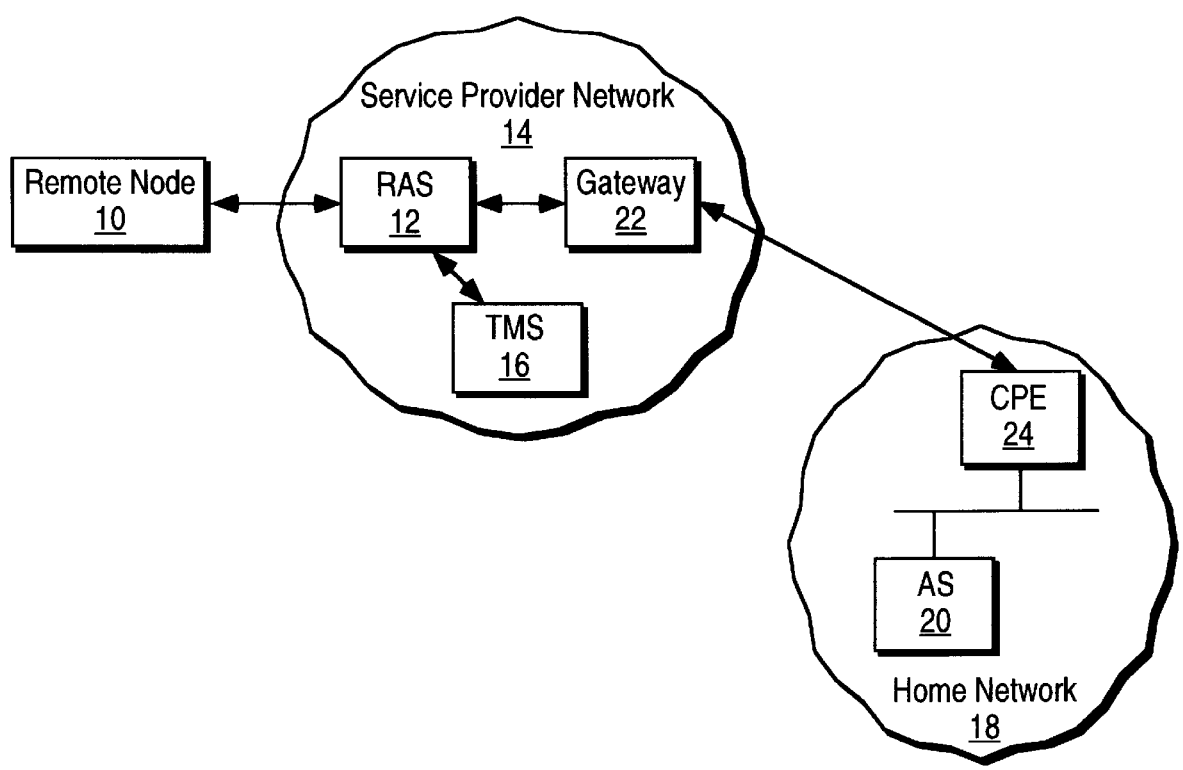

METHOD AND APPARATUS FOR TRANSPARENTLY PROVIDING MOBILE NETWORK FUNCTIONALITY

FIELD OF THE INVENTION

The invention relates generally to computer networking systems, and, in particular, to providing mobile functionality to computers attached to a network.

BACKGROUND OF THE INVENTION

Existing network protocols make an implicit assumption that a node's point of attachment to a network remains fixed, and that its network address identifies the network to which it is attached. Packets of information are sent to the node based in part on the node's network address.

A node may become a remote node by attaching to a separate network and communicating with its original network via telephone lines and other channels. However, if the remote node keeps its network address unchanged, its address will not reflect its new point of attachment. As a result, existing routing protocols would be unable to route packets of information to the node's new point of attachment.

Mobile routing protocols, however, do exist to define mobile functions that allow a node to change its point of attachment from one network to another without having to change its network address. Typically, to implement the mobile routing protocols, additional software needs to be loaded onto the remote node to enable the node to communicate with its original network without having to change its network address. As a result, a user is burdened with installing the mobile protocol software on their computer system and testing it to be sure it operates properly.

SUMMARY OF THE INVENTION

The present invention provides a method and apparatus for transparently providing a remote node with mobile network functionality. One embodiment of the present invention includes a remote node contacting a service provider to establish a remote connection with a home network. In response, the service provider generates an authentication request, on behalf of the remote node to obtain access to the home network. The service provider then sends the authentication request to an authentication server residing at the home network. The service provider then establishes, on behalf of the remote node, a remote connection between the remote node and the home network to enable packets to be transferred between the remote node and the home network.

BRIEF DESCRIPTION OF THE DRAWINGS

The present invention is illustrated by way of example and not limitation in the figures of the accompanying drawings, in which like references indicate similar elements, and in which:

FIG. 1 illustrates a network configuration capable of implementing one embodiment of the present invention.

DETAILED DESCRIPTION

Figure 2A:
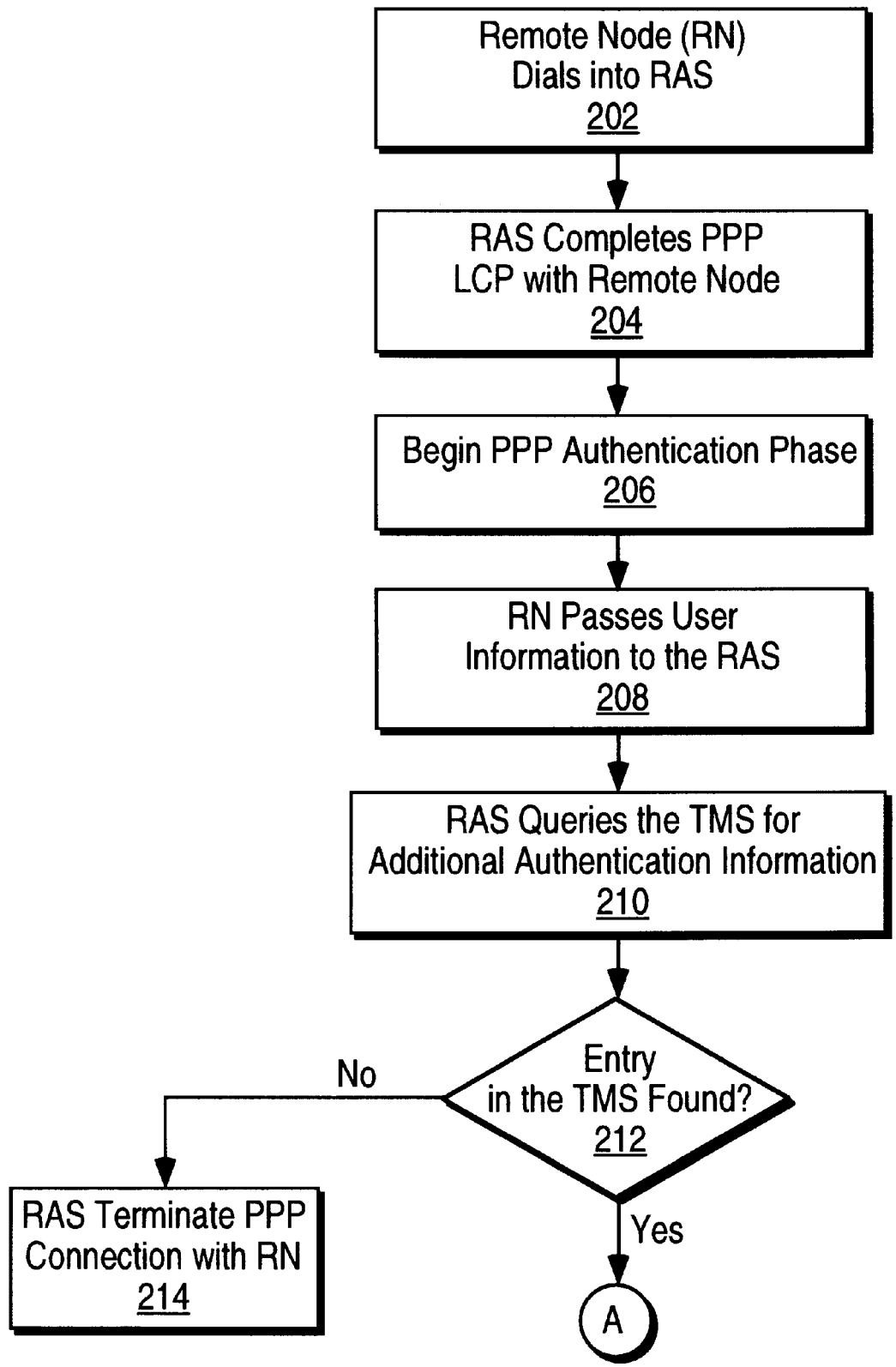
FIGS. 2A to 2C illustrate a flow diagram describing the steps of the invention according to one embodiment.

A method and apparatus are described for transparently providing mobile functionality to a remote node. In particular, the mobile functionality is provided by a service provider's dial-in access server on behalf of the remote node. As a result, the present invention enables the remote node to send and receive datagrams from any point of attachment without having to change its network address and without having to load additional software onto the remote node to provide the mobile functionality.

In the following description, numerous specific details are set forth in order to provide a thorough understanding of the present invention. It will be apparent, however, to one of ordinary skill in the art that the present invention may be practiced without these specific details. In other instances, well-known standards, structures, and techniques have not been shown in order not to unnecessarily obscure the present invention.

Referring to FIG. 1, a network configuration is shown wherein a server provider's 14 dial-in access server (hereinafter referred to as the Remote Access Server (RAS)) provides mobile functionality on behalf of a remote node, according to one embodiment of the invention.

As shown, a user operating a remote node 10 attempts to establish a remote connection over a service provider's network 14 to a destination that is presently identified by the node's 10 network address as being attached to the network to which the node 10 is attached (herein after referred to as the home network 18). The node typically consists of a portable computer.

To begin establishing the connection, the user dials into the RAS 12 with the remote node 10. In response, the RAS 12 completes the Link Control Protocol (LCP) phase and initiates the authentication phase of the Point-to-Point Protocol (PPP). In particular, the RAS 12, using a user name (domain and user id's) and other information provided by the remote node queries the service provider's Tunnel Management System (TMS) 16 to obtain the address of the gateway to the remote node's 10 home network 18 and other information needed to establish connection with a destination within the home network 18. The TMS 16 is a database that includes information that enables the RAS 12 to perform remote authentication on behalf of the node 10 and further establish open communication between the remote node and the home network.

Once the TMS 16 has provided the RAS 12 with the requested information, the RAS 12 uses this information to generate a remote authentication request that is sent to the appropriate Authentication Server (AS) 20 residing in the user's home network 18. The AS 20 is an open system (e.g. UNIX host), which may contain a user profile database and uses a remote user authentication protocol to authenticate dial-in PPP connections.

The RAS 12 forwards the authentication request to the appropriate gateway 22. The gateway 22 then forwards the request via a virtual circuit (e.g. Frame Relay or ATM virtual circuit) to the Customer Premise Equipment (CPE) 24 of the home network 18, which is then responsible for forwarding the request to the appropriate AS 20 located in the home network 18. In one embodiment, a gateway 22 may translate the RAS's request into an alternate protocol format for the AS.

Once the user is authenticated by the AS 20, the RAS 12 begins to establish a "tunnel" with the appropriate gateway 22 by generating and sending a tunnel registration request to the appropriate gateway. Tunneling is a method for avoiding protocol restrictions by encapsulating packets from one protocol in a packet for another protocol and then transmitting the encapsulated packet over a network that supports the encapsulating protocol.

The gateway 22 completes the tunnel by responding to the RAS 12 with a tunnel registration response. Once the tunnel is complete, the authentication phase of PPP is complete and the RAS 12 may then perform the Network Control Protocol (NCP) negotiations with the remote node 10 in order to finish establishing open communication between the remote node 10 and the home network 18.

By having the RAS providing mobile functionality on behalf of the remote node, significant benefits are provided, including avoiding having to load additional software on to the remote node or otherwise configure the remote node to implement the mobile functions. This turns out to be a tedious and burdensome task for the average user.

In addition, by performing the authentication phase of the PPP connection via an AS located in the home network 18 rather than in the service provider, the home network is accorded additional privacy. For example, to the perform authentication phase via an AS located in the service provider, the home network would have to reveal much of its user profile information to the service provider. This would also require the service provider make available significant amounts of additional storage space.

Figure 2B:
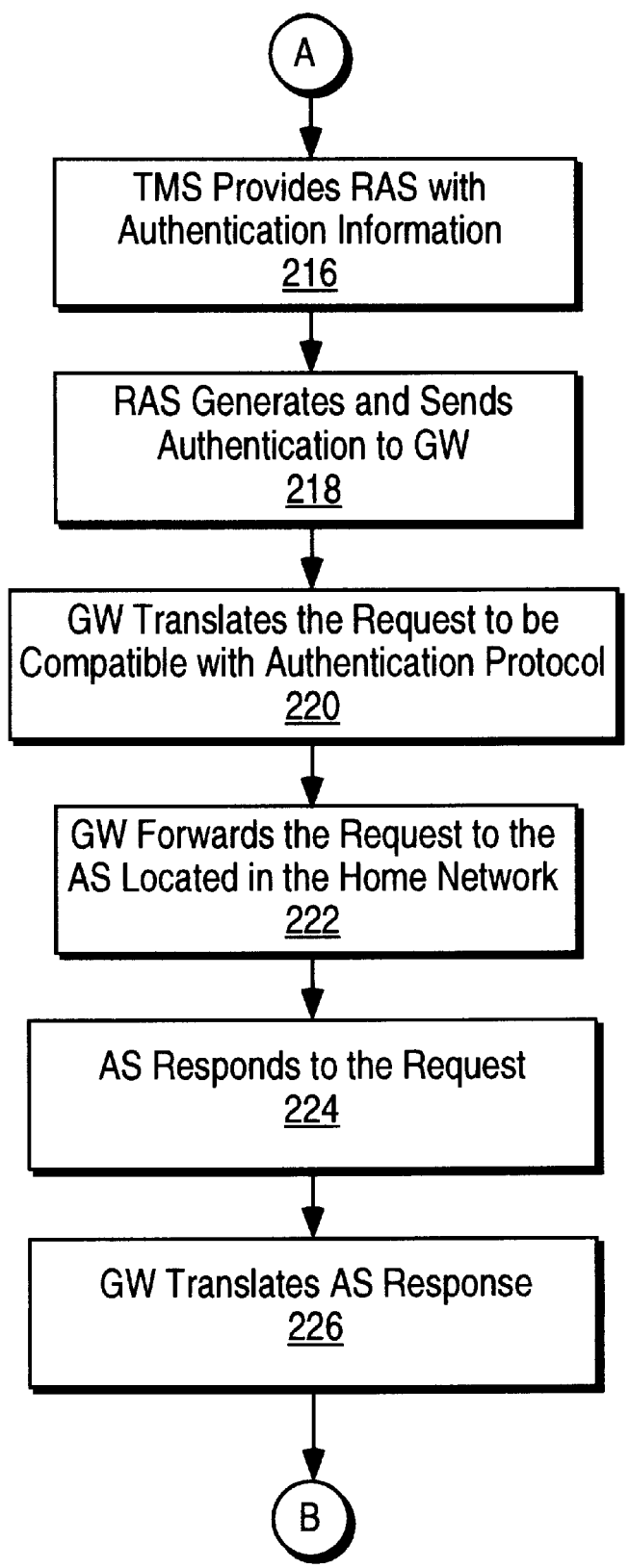
Figure 2C:
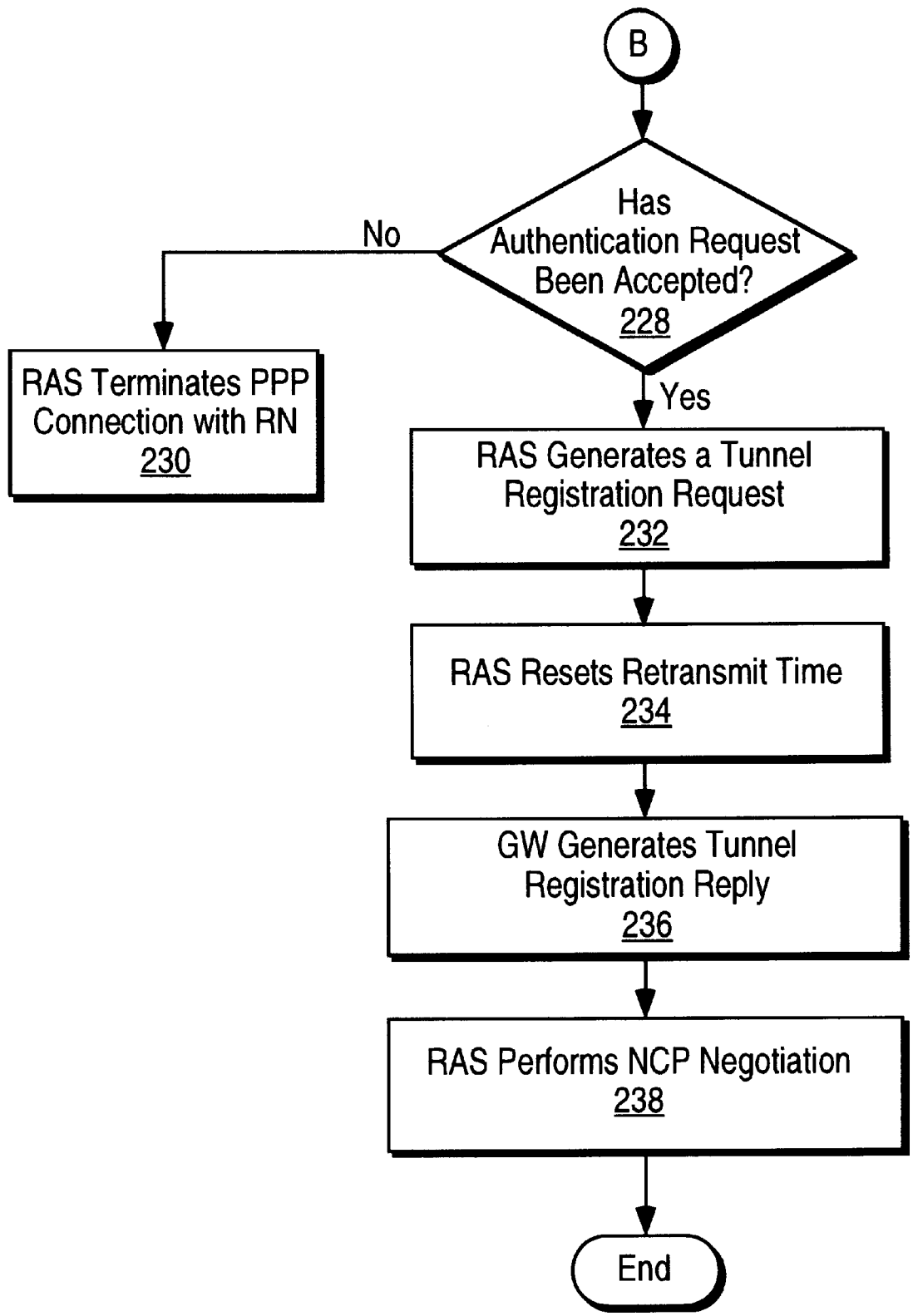

Referring to FIG. 2, a flow diagram is illustrated describing the steps of the present invention in more detail. In step 202, a user begins to establish a connection with a home network, via any point of attachment, by dialing into a RAS through a remote node. The user may dial in over a standard telephone line or over an Integrated Services Digital Network (ISDN) line. The actual number that the user dials may be a local number which connects to the nearest RAS, or an "800" number to a centralized RAS, over a Public Switching Telephone Network (PSTN).

In step 204, the remote node and the RAS complete a standard PPP link establishment negotiation (Link Control Protocol (LCP)). Once the PPP link establishment phase has completed successfully, in step 206 the PPP authentication phase begins. In one embodiment, this may be marked by the RAS sending a Challenge Handshake Authentication Protocol (CHAP) Challenge or Password Authentication Protocol (PAP) message to the remote node.

In response, in step 208, the remote node passes a set of user authentication information to the RAS. For example, assuming the remote node supports CHAP, the remote node may provide the RAS with a hash value that may include a Challenge Identifier, a session "secret", and a Challenge Value, along with a user specified login name. In one embodiment, the first part of the login name includes a user name and the second part includes a domain specific part.

In step 210, the RAS uses the information received from the remote node to query the TMS for additional information needed to complete authentication of the remote node via a remote AS residing in the home network. In one embodiment, the query to the TMS includes the domain specific part of the login name and a Dialed Number Identification Service (DNIS) number, if available.

In step 212, the TMS uses the domain part of the login name and the DNIS number, if provided, as a compound key to find an entry in the TMS database.

If an entry is not found, in step 214 the TMS will send a message to the RAS indicating an entry was not found. In response, the RAS will then terminate the PPP connection with the remote node.

If an entry is found in the TMS database, in step 216 the TMS will provide the RAS with information to complete the authentication request and establish a tunnel with the appropriate gateway on behalf of the remote node. In one embodiment, the information provided to the RAS by the TMS may include the following:

the Internet Protocol (IP) address of the gateway interface which connects to the home network;

the type and address of the link from the gateway to the node's home network (e.g. Frame Relay and DLCI, respectively);

the IP address of the appropriate AS located within the home network;

the user authentication protocol type used by the AS; and possibly, tunnel registration authentication information.

After receiving this information from the TMS, in step 218 the RAS internally stores the information provided by the TMS and also uses some of the information to generate an authentication request, which is then sent to the gateway identified in the information provided by the TMS.

For example, in one embodiment, the authentication request generated by the RAS may include a username, a password, a challenge request and response, the IP address of the AS, and the authentication protocol used by the AS. The authentication request is then sent to the appropriate gateway. In one embodiment, all traffic between the RAS and the gateway, including the authentication request and reply, and the tunnel registration and response, are transmitted via IP protocol messaging.

Upon receipt of the authentication request, in step 220 the gateway converts the authentication request into a request compatible with the user authentication protocol used by the AS. In one embodiment, the Remote Authentication Dial In User Service (RADIUS) protocol is used by the AS.

Afterwards, in step 222 the gateway forwards the request via a mapped virtual circuit to the CPE of the home network 20, which is then responsible for forwarding the request to the appropriate AS located in the home network 20.

In step 224, the AS returns an authentication response. In step 226, the gateway translates the response from the user authentication protocol to the original protocol used to transmit the request from the RAS to the gateway. After the translation, the response is forwarded to the RAS.

In step 228, the RAS determines whether the request has been accepted. If the authentication request has been rejected, in step 230 the RAS terminates the PPP connection with the remote node. An authentication request may possibly be rejected because either the user's name does not appear in the AS database, or because the password or challenge response is incorrect.

If the authentication request has been accepted, the response from the AS will typically include a user profile, which the RAS stores internally. The RAS may use the user profile sometime thereafter during a Network Control Protocol (NCP) negotiation.

In one embodiment, the user profile information provided by the AS 20 may include the following information:

remote node type (e.g. computer or router);

permitted protocols (e.g. IP over PPP (IPCP) or IPX over PPP (IPXCP));

remote node IPCP address;

remote node IPCP netmask (for LAN dial-in); and remote node IPXCP network number.

Once the RAS has determined that the user authentication is successful, in step 232 the RAS generates and sends a tunnel registration request to the gateway to begin establishing a tunnel between the RAS and the gateway. In one embodiment, the registration request is built from the information obtained from the TMS and the AS (residing in the home network), and further includes IP extensions that convey configuration information.

In one embodiment, the tunnel registration request is forwarded in a packet, which is formatted with a standard IP packet header and authentication extensions followed by vender specific extensions. The data included in the request, and its proprietary extension fields, may include the following data:

- the remote node's home address;
- the IP address of the gateway used to forward the data to the home network;
- a gateway interface extension, which specifies the interface type and interface address that gateway will use to forward packets to the home network;
- the IP address of the RAS interface which enables the remote node to receive data from the home network regardless of the remote node's point of attachment (hereinafter referred to as a care-of address); and
- a tunnel ID, which uniquely identifies the path between the tunnel endpoints and enables the RAS and the gateway to distinguish between tunnels that may be set up for multiple users between the same endpoint IP addresses.

In step 234, after sending the tunnel registration request, the RAS sets a retransmit time and expects a registration reply from the gateway within a predetermined period of time. The RAS will retransmit the request if a response is not received within the predetermined period of time. After a predetermined number of unsuccessful attempts, the RAS will terminate the PPP connection with the remote node.

Once the gateway has received the tunnel registration request from the RAS, in step 236, the gateway generates a reply message to indicate the success of the request, which is typically included in a dedicated code field of the response. Upon receipt of a successful registration reply message from the gateway, the PPP authentication phase between the remote node and the RAS is complete.

In one embodiment, the tunnel that is established between the RAS and the gateway consist of a full-duplex routing path for each dial up session. Each tunnel is capable of carrying arbitrary network layer packet protocols via the IP protocol.

Once the tunnel is established, the PPP authentication phase is completed. Afterwards, in step 238, the RAS proceeds to complete the PPP connection by performing a Network Control Protocol (NCP) negotiation with the remote node. Thereafter, open communication is available between the remote node and its home network, using the GRE and the Mobile IP protocol.

Thereafter, the RAS maintains the tunnel lifetime for the duration of the remote connection, and deregisters the tunnel if the PPP connection with the remote node terminates prior to the expiration of the tunnel.

MOBILE IP SUMMARY

The Mobile IP protocol is intended to enable nodes to move from one IP subnetwork to another IP subnetwork, without having to change their IP addresses. A few key terms used in describing the Mobile IP are briefly defined below:

Mobile Node

A computer (or router) that changes its point of attachment from one network or subnetwork to another without changing its IP address; it may continue to communicate with other Internet nodes at any location using its (constant) IP address, assuming link-layer connectivity to a point of attachment is available.

Home Agent

A router on a mobile node's home network which tunnels packets to the mobile node when the node is detached from the home network, and maintains current location information for the mobile node. In the present invention, as described above, the gateway serves as the home agent.

Foreign Agent

A point of attachment on a network, which the mobile node is visiting, which provides routing services to the mobile node when registered at the separate network. The foreign agent decapsulates and delivers packets to the mobile node that were encapsulated by the mobile node's home agent. When packets are sent by a mobile node, the foreign agent may serve as a default router for registered mobile nodes. In the present invention, as described above, the RAS serves as the foreign agent.

A summary of the Mobile IP protocol operations are as follows. The foreign and home agents advertise their presence via Agent Advertisement messages. A mobile node may optionally solicit an Agent Advertisement message from any locally attached mobility agents through an Agent solicitation message.

When a mobile node receives these Agent Advertisements, it determines whether it is on its home network or a foreign network. When the mobile node detects that it is located on its home network, it operates without mobility services.

When a Mobile node detects that it has moved to a foreign network, it obtains a care-of address on the foreign network. The mobile node operating away from home then registers its new care-of address with its home agent through exchange of a Registration Request and Registration Reply messages with the home agent, possibly via a foreign agent.

Packets sent to the mobile node's home address are then intercepted by its home agent, tunneled by the home agent to the mobile node's care-of address, received at the tunnel endpoint (either at a foreign agent or at the mobile node itself), and finally delivered to the mobile node.

The Mobile IP protocol uses tunneling to hide a mobile node's home address from intervening routers between its home network and its current location. The tunnel terminates at the mobile node's care-of address. At the care-of address, the original packet is removed from the tunnel and delivered to the mobile node via conventional IP routing.

In the reverse direction, packets sent by the mobile node are generally delivered to their destination using standard IP routing mechanisms, not necessarily passing through the home agent.

In one embodiment, to begin transmitting the packets via the tunnel, the packets are first encapsulated as IP packets based on the Generic Routing Encapsulation (GRE) method. The GRE method encapsulates a payload packet by prepending a GRE header and IP delivery header to the packet. The GRE header will typically specify the payload type and a tunnel ID. When the GRE packet is received by the opposite tunnel end, the IP delivery and GRE headers are stripped and the enclosed packet is forwarded to a payload protocol.

In alternative embodiments, the present invention may be applicable to implementations of the invention on integrated circuits or chip sets, wireless implementations, switching systems products and transmission systems products. For purposes of this application, the terms switching systems products shall be taken to mean private branch exchange (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services.

The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

In addition, the present invention may be implemented on a storage medium having stored thereon instructions which can be used to program a computer to perform the present invention. The storage medium includes, but is not limited to, floppy disks, optical disks, CDROMs, and magneto-optical disks, ROMs, RAMs, EPROMs, EEPROMs, magnet or optical cards, or any type of medium suitable for storing electronic instructions. Alternatively, the present invention could be implemented in discrete hardware components such as large-scale integrated circuits (LSI's), application-specific integrated circuits (ASIC's) or in firmware.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method to allow a remote node, exclusive of software capable of independently providing mobile network functionality, to establish data communication with a home network, the method comprising:

a remote access server (RAS) detecting an attempt by the remote node to establish communication with the home network;

the RAS authenticating the remote node through an authentication server (AS) associated with the home network, said authenticating performed transparently relative to the remote node; and the RAS initiating a tunnel connection with a gateway (GW), on behalf of the remote node, that provides access to the home network, wherein the tunnel connection enables packets associated with a first protocol to be transmitted between the remote node and the home network according to a second protocol, to establish data communication between the remote node and the home network.

2. The method of claim 1, further comprising:

the RAS generating an authentication request, on behalf of the remote node, to obtain access to the home network;

the RAS sending the authentication request to an authentication server (AS) residing at the home network.

3. The method of claim 2, further comprising:

the RAS providing a point-of-presence for accessing a service provider, wherein the service provider is associated with the gateway (GW) providing a connection to the home network; and the RAS including a tunnel management system (TMS).

4. The method of claim 1, further comprising:

the RAS receiving a connection from the remote node, wherein the connection is generated by the remote node dialing into the RAS.

5. The method of claim 3, further comprising:

the RAS providing the TMS with a domain name provided by the remote node; and the RAS requesting the TMS to provide the RAS with at least an address of the gateway providing the connection with the home network, an address of the authentication server residing in the home network, and an authentication protocol used by the authentication server residing in the home network.

6. The method of claim 2, further comprising:

the RAS sending the authentication request to the GW, wherein the authentication request includes at least the address of the authentication server residing in the home network.

7. The method of claim 1, further comprising:

the RAS receiving a response from the GW completing the tunnel connection with the RAS.

8. The method of claim 1 implemented on a switching system product.

9. The method of claim 1 implemented on a transmissions system product.

10. A computer-readable medium having stored thereon a plurality of instructions including a first set of instructions for providing a remote node with a mobile network connection, wherein the first set of instructions, when executed by a processor, cause the processor to perform a method comprising:

a remote access server (RAS) detecting an attempt by the remote node, exclusive of software capable of independently providing mobile network functionality, to establish communication with a home network;

the RAS authenticating the remote node through an authentication server (AS) associated with the home network, said authenticating performed transparently relative to the remote node; and the RAS initiating a tunnel connection with a gateway (GW), on behalf of the remote node, that provides access to the home network, wherein the tunnel connection enables packets associated with a first protocol to be transmitted between the remote node and the home network according to a second protocol, to establish communication between the remote node and the home network.

11. The computer-readable medium of claim 10, wherein the method further comprises:

the RAS generating an authentication request, on behalf of the remote node, to obtain access to the home network; and the RAS sending the authentication request to an authentication server (AS) residing at the home network.

12. The computer-readable medium of claim 11, wherein the method further comprises:

the RAS providing a point-of-presence for accessing a service provider, wherein the service provider is associated with the gateway (GW) providing a connection to the home network; and the RAS including a tunnel management system (TMS).

13. The computer-readable medium of claim 10, wherein the method further comprises:

the RAS receiving a connection from the remote node, wherein the connection is generated by the remote node dialing into the RAS.

14. The computer-readable medium of claim 12, wherein the method further comprises:

the RAS providing the TMS with a domain name provided by the remote node; and the RAS requesting the TMS to provide the RAS with at least an address of the gateway providing the connection with the home network, an address of the authentication server residing in the home network, and an authentication protocol used by the authentication server residing in the home network.

15. The computer-readable medium of claim 11, wherein the method further comprises:

the RAS sending the authentication request to the GW, wherein the authentication request includes at least the address of the authentication server residing in the home network.

16. The computer-readable medium of claim 10, wherein the method further comprises: the RAS receiving a response from the GW completing the tunnel connection with the RAS.

17. The computer-readable medium of claim 10 implemented on a switching system product.

18. The computer-readable medium of claim 10 implemented on a transmissions system product.

19. An apparatus comprising:

a remote access server (RAS) to detect an attempt by a remote node, exclusive of software capable of independently providing mobile network functionality, to establish communication with a home network;

the RAS to authenticate the remote node through an authentication server (AS) associated with the home network, said authenticating performed transparently relative to the remote node; and the RAS to initiate a tunnel connection with a gateway (GW), on behalf of the remote node, that provides access to the home network, wherein the tunnel connection enables packets associated with a first protocol to be transmitted between the remote node and the home network according to a second protocol, to establish communication between the remote node and the home network.

20. The apparatus of claim 19, wherein:

the RAS is operable to generate an authentication request, on behalf of the remote node, to obtain access to the home network, and to provide the authentication request to an authentication server (AS) residing at the home network.

21. The apparatus of claim 19, wherein:

the RAS is further operable to provide a point-of-presence to access a service provider, wherein the service provider is associated with the gateway (GW) that provides access to the home network; and wherein the RAS includes a tunnel management system (TMS).

22. The apparatus of claim 19, wherein:

the RAS detects the attempt by a remote node to establish communication with a home network in response to the remote node dialing into the RAS.

23. The apparatus of claim 21, wherein:

the RAS is operable to provide the TMS with a domain name provided by the remote node, and further operable to request the TMS to provide the RAS with at least an address of the gateway that provides access to the home network, an address of the authentication server that resides in the home network, and an authentication protocol used by the authentication server that resides in the home network.

24. The apparatus of claim 20, wherein:

the RAS is operable to send the authentication request to the GW, wherein the authentication request includes at least the address of the authentication server that in the home network.

25. The apparatus of claim 19, wherein the apparatus comprises a switching system product.

26. The apparatus of claim 19, wherein the apparatus comprises a transmissions system product.

* * * * *